United States Patent [19]

Awerbuch et al.

[11] Patent Number: 4,534,174
[45] Date of Patent: Aug. 13, 1985

[54] GEOTHERMAL REBOILER APPARATUS AND METHOD

[75] Inventors: Leon Awerbuch, San Francisco; Victor C. Van der Mast, Lafayette, both of Calif.

[73] Assignee: Bechtel International Corporation, San Francisco, Calif.

[21] Appl. No.: 555,308

[22] Filed: Nov. 25, 1983

[51] Int. Cl.³ ............................................... F03G 7/00
[52] U.S. Cl. ................................................. 60/641.5
[58] Field of Search .................. 60/641.2, 641.4, 641.5

[56] References Cited

U.S. PATENT DOCUMENTS 4,244,190  1/1981  Lieffers ............................. 60/641.5
4,319,895  3/1982  Kemmer ......................... 60/641.5 X Primary Examiner—Allen M. Ostrager
Attorney, Agent, or Firm—Townsend and Townsend

[57] ABSTRACT

Apparatus and method for handling geothermal brine containing high non-condensible gas concentrations. The brine is directed into a pre-flash chamber where a vapor fraction is separated from a liquid fraction, the vapor fraction including steam and a non-condensible gas. The vapor fraction is directed into and through a reboiler in countercurrent flow relationship to a condensate. This action causes the steam of the vapor fraction to be stripped from the non-condensible gas and also causes the condensate to be heated by the steam. The non-condensible gas flows out of the reboiler to a gas expander collection station, or to the atmosphere while the condensate flows to a flash chamber where it flashes to obtain clean steam for driving a work producing apparatus, such as a turbine. The condensate from the flash chamber is returned by a pump to the condensate inlet of the reboiler to form a closed system.

28 Claims, 1 Drawing Figure

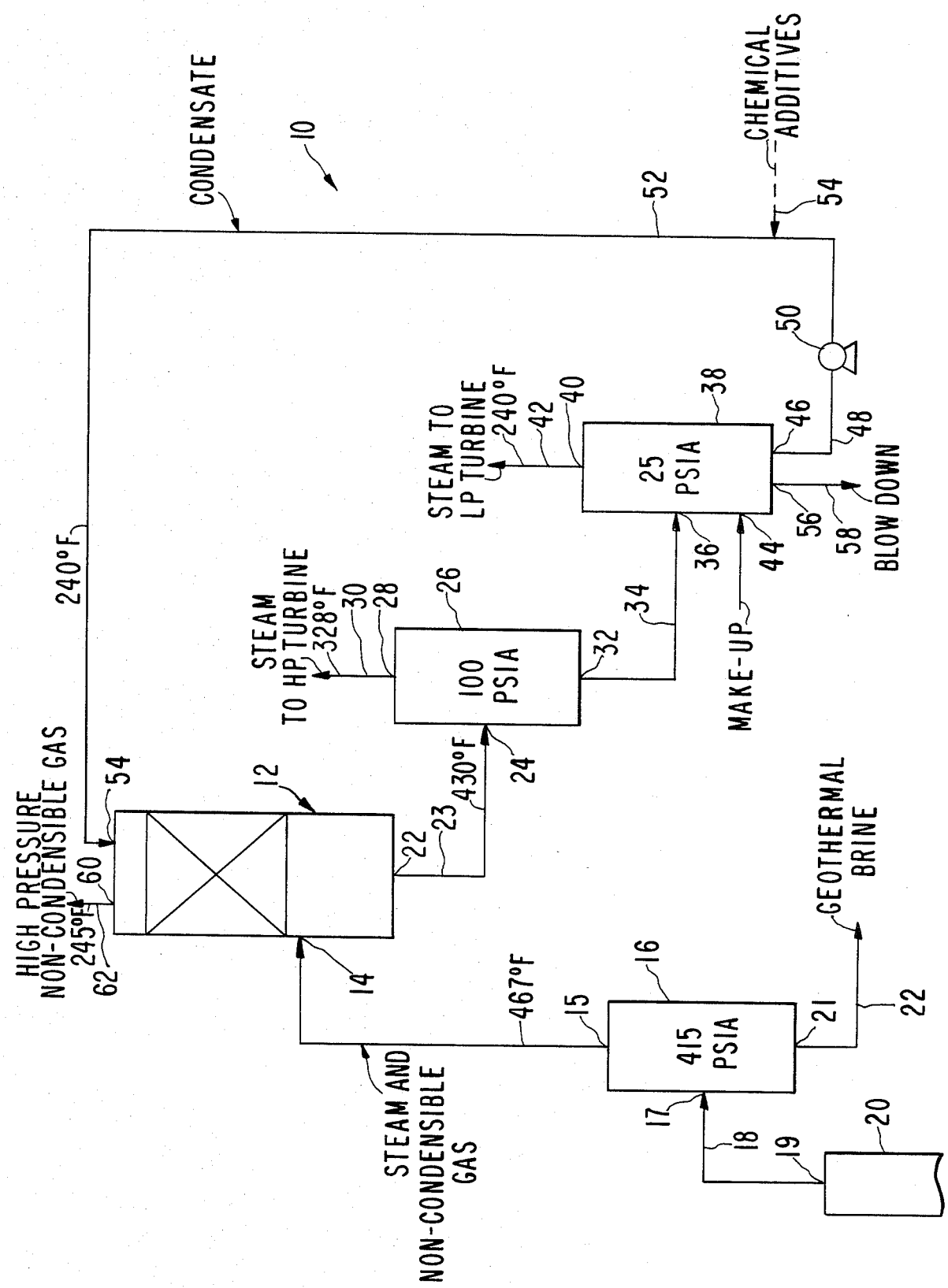

GEOTHERMAL REBOILER APPARATUS AND METHOD

BACKGROUND OF THE INVENTION

1. Field of the Invention

Certain geothermal brines contain high non-condensible gas concentrations. Typically, these brines are flashed in a pre-flash vessel to remove the non-condensible gases from the rest of the brine. By pre-flashing the geothermal brine, however, a considerable fraction of the geothermal steam is also flashed off. This steam is typically recovered in a shell and tube reboiler.

2. Description of the Prior Art

Because of the nature of the pre-flash vapor, heat transfer performance of the shell and tube reboiler is poor. As a result, expensive tube alloys, such as Inconel 625, are required because of the corrosive nature of the pre-flash vapor. In addition, because of the temperature driving force required for steam generation in a shell-and-tube heat exchanger, the energy recovery is limited, particularly for high concentrations of non-condensible gases.

Because of these and other drawbacks in the handling of geothermal brines containing non-condensible gases, a need exists for improvements in the recovery of energy from such brines to obtain maximum efficiency while substantially eliminating corrosion problems.

Prior patents relating to the processing of geothermal brines include U.S. Pat. Nos. 3,953,972 and 4,138,851.

SUMMARY OF THE INVENTION

The present invention is directed to an apparatus and a method for satisfying the aforesaid need wherein brine from a geothermal well is pre-flashed to separate the liquid and vapor fractions of the brine, the vapor fraction including steam and non-condensible gases. The vapor fraction is then sent to a direct contact reboiler where the steam is used to heat a relatively cool condensate flowing through the reboiler, and the non-condensible gases are cooled and separated from the steam. The non-condensible gases are directed to the atmosphere or to a collection means. The energy contained in the high pressure, non-condensible gases from a collection means can be used in energy recovery devices like gas expanders and ejectors. The chemicals contained in the non-condensible gases can be used in chemical reactions to obtain minerals, adjust brine chemistry or recover gas values. Heat energy from the steam is used to heat the condensate and the steam thereby condenses, separating it from the non-condensible gases, whereby corrosion problems are clearly avoided while maximum energy recovery from the brine is achieved.

The heated condensate flowing out of the direct contact reboiler can be flashed further to provide steam to drive a high pressure turbine as well as a low pressure turbine. Then, the condensate from the flash chamber is recirculated back to the direct contact reboiler to provide a substantially closed system.

The primary object of the present invention is to provide an improved apparatus and method for handling geothermal brine having high non-condensible gas concentrations wherein the invention operates to separate the non-condensible gases from the geothermal steam after the brine has been flashed to separate the liquid and vapor fractions thereof, and the separation of steam and non-condensible gases can occur while heat energy from the steam is made available to thereby permit maximum energy recovery while substantially eliminating corrosion problems.

Another object of the present invention is to provide an apparatus and a method of the type described wherein the steam and non-condensible gases are separated from each other by direct contact of the steam with a relatively cool condensate, whereby the heat energy from the steam is transferred to the condensate while the steam condenses and separates from the non-condensible gases, causing the heated condensate to be in the form of a clean fluid suitable for use in energy recovery, such as by driving one or more turbines.

Other objects of this invention will become apparent as the following specification progresses, reference being made to the single FIGURE which shows a schematic diagram of the apparatus of the present invention.

DETAILED DESCRIPTION OF THE PREFERRED EMBODIMENT

The energy recovery system of the present invention is broadly denoted by the numeral 10 and includes a direct contact reboiler 12 having first fluid inlet 14 for receiving flashed vapor from the outlet 15 of a flash chamber 16 whose inlet 17 is coupled by a pipe 18 to the outlet 19 of a geothermal well 20. The flash chamber 16 also has a second outlet 21 coupled by a pipe 22 to other equipment (not shown) for further processing of the liquid fraction of brine leaving flash chamber 16.

Direct contact reboiler 12 has a fluid outlet 22 coupled by a pipe 23 to an inlet 24 of a flash chamber 26. Steam flashed in flash chamber 26 is directed out of the same through an outlet 28 thereof through pipe 30 to a work producing apparatus, such as a high pressure turbine.

A second outlet 32 of flash chamber 26 is coupled by a pipe 34 to an inlet 36 of a second flash chamber 38 having a first outlet 40 coupled by a pipe 42 to a second work producing apparatus, such as a low pressure turbine. The flash chamber 38 has a second inlet 44 to permit make-up water to be added to the system. It also has a second outlet 46 coupled by a pipe 48 to a pump 50 for pumping liquid condensate through a pipe 52 to a top inlet 54 of direct contact reboiler 12. A third outlet 56 is coupled to a pipe 58 to allow blowdown of chlorides and other carryover material from flash chamber 38.

Direct contact reboiler 12 has a second outlet 60 at the upper end thereof. Outlet 60 is coupled with a pipe 62 for directing the high pressure, non-condensible gases out of the system to the atmosphere, or to a suitable collector for energy recovery by gas expander, or by ejectors. The non-condensible gases can be directed to chemical or mineral recovery or disposal by injecting the gas into geothermal brine.

Chemical additives can be put into the system, if desired. For instance, chemical additives could be directed into pipe 52 from a pipe 54. The additives could be added to the system at other locations, if desired.

In operation, geothermal brine in a heated condition is directed into flash chamber 16 and caused to flash, the liquid fraction flowing out of the flash chamber through outlet 21 to pipe 22, and the vapor fraction flowing out of flash chamber 16 through outlet 15 toward direct contact reboiler 12. As the vapor fraction flows upwardly and into direct contact reboiler 12, the steam contacts the condensate flowing downwardly in counter current relationship to the upwardly flowing vapor fraction. The steam condenses as it heats the condensate. Also, the heat from the non-condensible gases is transferred to the condensate.

The non-condensible gases flow out of the direct contact reboiler 12 at a lower temperature than the temperature at which the vapor fraction enters direct contact reboiler 12. Typically, the temperature of the non-condensible gas as it leaves direct contact reboiler 12 through outlet 60 is about the same as the incoming condensate. Thus, the steam and non-condensible gases are separated from each other in the direct contact reboiler and the steam heats the condensate to a relatively high temperature so that it will flash when it expands in flash chamber 26.

The heated condensate travels through pipe 23 and into flash chamber 26 where it flashes to form clean steam which moves out of outlet 28 through pipe 30 to the first work producing apparatus, such as a high pressure turbine. The heated condensate leaving flash chamber 26 through outlet 32 thereof flows through pipe 34 to inlet 36 of flash chamber 38. When in flash chamber 38, the condensate flashes once again to produce clean steam which is directed out of the flash chamber 38 through outlet 40 thereof and through pipe 42 to the second work producing apparatus, such as a low pressure turbine. The condensate in flash chamber 38 is pumped through line 52 back to inlet 54 of direct contact reboiler 12 by pump 50. Blowdown materials are directed out of flash chamber 38 through outlet 56 thereof.

The vapor entering direct contact reboiler 12 is superheated and the reboiler itself can be a tray or packed column. The heat of condensation of the steam in reboiler 12 and the sensible cooling of the non-condensible gases heats the condensate entering reboiler 12 through inlet 54.

Pure water or geothermal brine can be used for the direct contact process. Other solutions, such as NaCl solutions, could be used to reduce $CO_2$ solubility in the liquid. A single flash chamber, such as flash chamber 26 could be used, flash chamber 38 being eliminated. For extremely high $CO_2$ concentrations in the brine (about 4% by weight) the hot liquid can be pre-flashed to remove $CO_2$ before flashing the condensate for steam production. This could occur between outlet 22 of reboiler 12 and inlet 24 of flash chamber 26. Chemicals added through pipe 54 to pipe 52 are provided, if required, for environmental and corrosion control.

Typical process conditions using condensate in the reboiler system have the values shown on the figure. Vapor from the geothermal brine pre-flash chamber 16 contains typically 22% by weight of $CO_2$. At 415 psia, this gives a superheated vapor temperature of 467° F. The condensing temperature of the inlet vapor at reboiler 12 at 415 psia is approximately 437° F. This is the maximum condensate temperature that can be obtained in the counter current reboiler. Typically, the hot condensate temperature leaving the reboiler 12 will be about 430° F. The exit temperature of the non-condensible gases will approach the temperature of the incoming condensate, typically 245° F. This will give a non-condensible gas which contains only 7% by volume of water vapor (dry non-condensible, high energy recovery). The hot condensate is then flashed, typically in a two stage fashion to pressures at 100 psia and 25 psia. Each steam source is combined with steam from brine flash at the same pressure. The cold (240° F.) condensate is then recycled to the countercurrent reboiler.

Typical duties for a 22 MW power plant are as follows:
1. The heat contained in the vapor stream from flash chamber 16: Q=130,000,000 btu/hr.
2. Condensate stream: $W_C$=685,000 lbs./hr.
3. Brine to pre-flash: $W_B$=2,200,000 lbs./hr.
4. Power requirements for condensate recycle: $H_P$=250 kw (approximately 1% of power production).

The advantages of the present invention over previous systems, such as those disclosed in U.S. Pat. Nos. 3,953,972 and 4,138,851 are as follows:
1. Capital cost requirements for the process of the present invention are relatively low.
2. The process of the present invention is feasible even at high (3% by weight) $CO_2$ concentrations in the brine. The shell and tube apparatus of conventional systems is highly problematical under these conditions because of the lowering of the steam partial pressures and steam condensing temperatures.
3. The hot condensate in the counter current direct contact reboiler of the present invention strives toward equilibrium with the inlet vapor. This minimizes $CO_2$ dissolution in the condensate which would subsequently enter the steam supply to the turbine. In most cases, the $CO_2$ content of hot condensate will be insignificant (below 0.1% weight of liquid).
4. Because of the direct contact between vapor and condensate in the reboiler and the counter current movements thereof, very low temperature approaches can be achieved and energy recovery can be enhanced without significant economic penalties.
5. The steam produced by the condensate flash in flash chambers 26 and 38 has a high purity and can be used directly in the turbines (no brine carryover).
6. The process of the present invention is simple with minimum risks of scale and corrosion. All unit processes have been proven.
7. The process of the present invention can be used independently of the use of downhole pumps.
8. When using condensate in the reboiler of the present invention, the condensate is kept separate from the brine. Thus, clean condensate which is generated can be used for the water supply.
9. All heat is fully recovered, no heat is rejected in the final condenser in the cycle of system 10.

System 10 is ideally suited for geothermal liquid dominated resources. However, a variation of this process can be used for dry geothermal systems for hydrogen sulfide removal. Moreover, system 10 can be modified to include the following:
1. A multi-stage arrangement of direct contact reboilers.
2. Single or multi-stage flash steam generation as required for power or direct use.
3. The concept of "pre-flash" of recirculating hot liquid to minimize steam contamination.
4. Provisions for environmental control of non-condensible gas discharge, particularly control of hydrogen sulfide emissions.
5. Provisions for generation of pure steam.
6. Provisions for use of geothermal brine or any other liquid as direct contact fluid.
7. Alternative for further cooling of recirculating fluid to reduce recirculatory flow by use of fluid heat for direct use (such as building heat supply, availability of clean water at 240° F.).

8. Provisions to recover energy and chemical values from the high pressure of non-condensible gases.

As used in this description and in the following claims, the term "fluid" includes water, brine, condensate organic and inorganic materials.

We claim:

1. Apparatus for handling geothermal brine capable of being flashed to form a vapor fraction containing steam and a non-condensible gas comprising: a direct contact reboiler; means coupled with the reboiler for directing the vapor fraction of flashed geothermal brine into the reboiler; means coupled with the reboiler for directing a condensate into the reboiler and into counter current flow relationship with the vapor fraction, whereby the condensate is heated by the vapor fraction and the steam is condensed and separated from the non-condensible gas; and means for coupling the reboiler to a work producing apparatus to permit the heated condensate from the reboiler to be directed toward said work producing apparatus for actuating the latter.

2. Apparatus as set forth in claim 1, wherein is included means defining a pre-flash chamber having a fluid inlet adapted to be coupled to a source of geothermal brine and an outlet, and means coupling the outlet of the chamber with the reboiler for directing flashed geothermal brine thereto.

3. Apparatus as set forth in claim 1, wherein the reboiler has a first inlet for receiving flashed geothermal brine and a second inlet for receiving said condensate, said second inlet being above the first inlet.

4. Apparatus as set forth in claim 1, wherein the reboiler has a first outlet for removal of non-condensible gases therefrom and a second outlet for removal of heated condensate therefrom, the second outlet being below the first outlet.

5. Apparatus as set forth in claim 1, wherein the reboiler has a first inlet near the lower end of the reboiler for receiving flashed geothermal steam, a second inlet near the upper end of the reboiler for receiving condensate, a first outlet near the upper end thereof for directing a non-condensible gas out of the reboiler, and a second outlet near the lower end of the reboiler for directing heated condensate out of the reboiler.

6. Apparatus as set forth in claim 1, wherein is included a flash chamber, said coupling means coupling the flash chamber with the reboiler for directing condensate into the flash chamber, whereby the condensate will flash to produce clean steam which can be used for driving a work producing device.

7. Apparatus as set forth in claim 6, wherein is included a second flash chamber coupled in series relationship to the first flash chamber for receiving condensate therefrom, whereby condensate flashed in the second chamber can be turned into pure steam for use in operating a work producing apparatus.

8. Apparatus as set forth in claim 6, wherein is included means for directing make-up water into one of the flash chambers.

9. Apparatus as set forth in claim 7, wherein the second flash chamber has means for directing blowdown material out of the same.

10. Apparatus as set forth in claim 7, wherein is included means for directing the condensate from the second chamber to the reboiler.

11. Apparatus as set forth in claim 1, wherein the reboiler has packing, perforated trays and bubble cups to provide countercurrent contact between condensate and vapor fraction.

12. Apparatus as set forth in claim 1, wherein the reboiler is a spray tower.

13. Apparatus as set forth in claim 7, wherein is included means for directing chemical additives into the system.

14. Apparatus as set forth in claim 1, wherein is included means coupled with the reboiler for directing a different fluid into the reboiler and into countercurrent relationship with the vapor fraction and non-condensible gas.

15. A method of handling a geothermal brine capable of being flashed to form a vapor fraction including steam and a non-condensible gas comprising: flashing geothermal brine in a first zone; moving the vapor fraction of the flashed geothermal brine to a second zone spaced from the first zone and into countercurrent heat exchange relationship to a fluid to separate the steam from the non-condensible gas and to heat the fluid; flashing the heated fluid in a third zone to provide pure steam and a fluid remainder; using the pure steam from the third zone for driving a work producing device; and directing the fluid remainder to said second zone for heat exchange relationship to the vapor fraction from the first zone.

16. A method as set forth in claim 15, wherein the vapor fraction and the fluid are moved in countercurrent relationship to each other.

17. A method as set forth in claim 15, wherein the vapor fraction is moved upwardly and the fluid is moved donwwardly in countercurrent relationship to and in direct contact with the vapor fraction.

18. A method as set forth in claim 15, wherein is included the step of exhausting from the non-condensible gas after it has been separated from the steam.

19. A method as set forth in claim 15, wherein is included the step of moving the fluid remainder from the third zone to a fourth zone, flashing the fluid in the fourth zone to form pure steam and fluid remainder; using the pure steam from the fourth zone for driving a second work producing device.

20. A method as set forth in claim 15, wherein is included the step of inserting chemical additives into the system.

21. A method as set forth in claim 15, wherein the fluid is defined as including water, condensate, brine and organic and inorganic materials.

22. A method as set forth in claim 15, wherein the fluid is defined as including a solid contained in a liquid.

23. A method of handling geothermal steam and non-condensible gases comprising: flashing a geothermal brine to form a vapor fraction including steam and non-condensible gases moving the vapor fraction into direct contact, countercurrent, heat exchange relationship to a fluid to separate the steam from the non-condensible gas to heat the fluid; and flashing the fluid to provide pure steam for driving a work-producing device.

24. A method as set forth in claim 23, wherein the steam can be saturated, superheated or contain moisture.

25. A method as set forth in claim 23, wherein the non-condensible gas is used in a gas expander to generate additional power.

26. A method as set forth in claim 23, wherein the non-condensible gas is used in an ejector for energy recovery.

27. A method as set forth in claim 23, wherein the non-condensible gas is processed for hydrogen sulfide emission control.

28. A method as set forth in claim 23, wherein the non-condensible gas is injected into the geothermal brine for mineral recovery or disposal.

* * * * *